(12) United States Patent
Hiraoka et al.

(10) Patent No.: US 10,031,021 B2
(45) Date of Patent: Jul. 24, 2018

(54) OPTICAL MEASUREMENT PROBE AND OPTICAL MEASUREMENT DEVICE PROVIDED WITH THE SAME HAVING A LIGHT GUIDE WITH A REFLECTION SURFACE FOR REFLECTING LIGHT AND CAUSING LIGHT TO ENTER THE LIGHT GUIDE

(71) Applicants: SHIMADZU CORPORATION, Kyoto-shi, Kyoto (JP); HONDA MOTOR CO., LTD., Tokyo (JP)

(72) Inventors: Ryoji Hiraoka, Hirakata (JP); Nobuyuki Iwai, Kyoto (JP); Tetsuya Nagai, Nishinomiya (JP); Yasuyuki Furukawa, Kyoto (JP); Isao Azumagakito, Wako (JP); Mitsuru Kowada, Wako (JP); Satoru Okada, Wako (JP)

(73) Assignees: SHIMADZU CORPORATION, Kyoto-shi (JP); HONDA MOTOR CO., LTD., Tokyo (JP)

( * ) Notice: Subject to any disclaimer, the term of this patent is extended or adjusted under 35 U.S.C. 154(b) by 85 days.

(21) Appl. No.: 15/114,528

(22) PCT Filed: Feb. 21, 2014

(86) PCT No.: PCT/JP2014/054149
§ 371 (c)(1),
(2) Date: Jul. 27, 2016

(87) PCT Pub. No.: WO2015/125270
PCT Pub. Date: Aug. 27, 2015

(65) Prior Publication Data
US 2016/0349107 A1 Dec. 1, 2016

(51) Int. Cl.
*G01J 1/04* (2006.01)
*G01J 3/02* (2006.01)
*G01M 15/02* (2006.01)

(52) U.S. Cl.
CPC ............ *G01J 1/0425* (2013.01); *G01J 3/021* (2013.01); *G01J 3/0218* (2013.01); *G01J 3/0289* (2013.01); *G01M 15/02* (2013.01)

(58) Field of Classification Search
CPC . F23N 5/16; G01J 3/021; G01J 1/0425; G01J 3/0218; G01J 5/0014; G01J 5/042;
(Continued)

(56) References Cited

U.S. PATENT DOCUMENTS 5,219,227 A * 6/1993 Yang ..................... F02D 35/022
374/143
9,277,852 B2 * 3/2016 Fujiwara ............ A61B 1/00177

FOREIGN PATENT DOCUMENTS

JP 3-25144 U 3/1991
JP 3-120429 A 5/1991
(Continued)

OTHER PUBLICATIONS

Office Action dated Aug. 22, 2017, issued in counterpart Japanese Application No. 2016-503850, with English machine translation. (5 pages).
(Continued)

*Primary Examiner* — Que T Le
(74) *Attorney, Agent, or Firm* — Westerman, Hattori, Daniels & Adrian, LLP (57) ABSTRACT

Light from a direction (D) different from a predetermined direction is reflected by a tapered surface (21) so as to enter an optical fiber (4) for guiding light entering along the predetermined direction to an appliance. Light from the desired direction (D) may thereby be reflected by the tapered
(Continued)

surface (21) according to the angle of the tapered surface (21) and may be made to enter the optical fiber (4). Accordingly, even in a case where the installation position of an optical measurement probe (1) is limited, if the angle of the tapered surface (21) is appropriately set, light from the desired direction (D) may be made to enter the optical fiber (4).

10 Claims, 7 Drawing Sheets (58) Field of Classification Search
CPC ......... G01J 1/04; G01M 15/02; F02D 35/022; G02B 6/262; G01B 11/255; G02F 2001/133607
USPC ...................... 250/554, 551, 227.11, 227.14
See application file for complete search history.

(56) References Cited

FOREIGN PATENT DOCUMENTS

| | | |
|---|---|---|
| JP | 8-261838 A | 10/1996 |
| JP | 3182445 U | 3/2013 |
| JP | 2014-2097 A | 1/2014 |

OTHER PUBLICATIONS

International Search Report dated Mar. 25, 2014, issued in counterpart International Application No. PCT/JP2014/054149 (2 pages).

\* cited by examiner

OPTICAL MEASUREMENT PROBE AND OPTICAL MEASUREMENT DEVICE PROVIDED WITH THE SAME HAVING A LIGHT GUIDE WITH A REFLECTION SURFACE FOR REFLECTING LIGHT AND CAUSING LIGHT TO ENTER THE LIGHT GUIDE

TECHNICAL FIELD

The present invention relates to an optical measurement probe for guiding light that is generated at the time of combustion to an appliance, and an optical measurement device provided with the same.

BACKGROUND ART

For example, at the time of evaluation of a combustion state in a combustion chamber of an internal combustion engine of a car, measurement is performed using an optical measurement probe for guiding light that is generated at the time of combustion to an appliance (for example, see Patent Document 1). This type of optical measurement probe is provided with a light guide made of optical fiber, for example, and is capable of causing light in a predetermined field of view range to enter the light guide, and of guiding the light to an appliance by the light guide.

Figure 6:
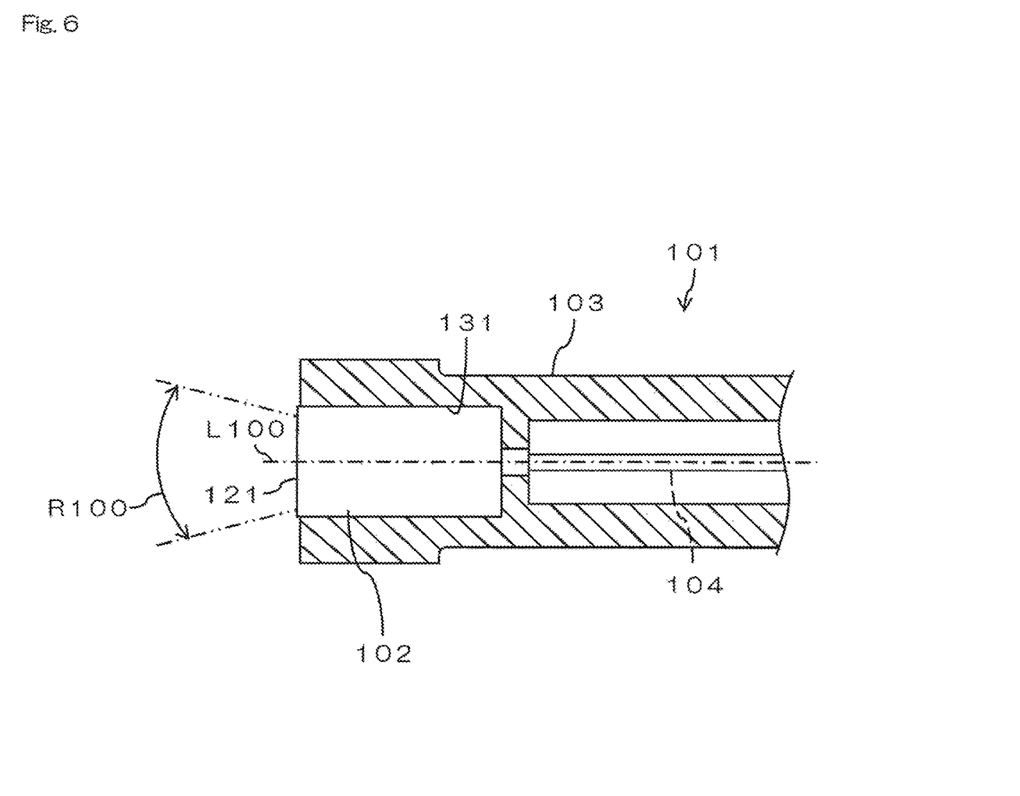
FIG. 6 is a cross-sectional diagram showing main sections of an example structure of a conventional optical measurement probe.

FIG. 6 is a cross-sectional diagram showing main sections of an example structure of a conventional optical measurement probe 101. The optical measurement probe 101 includes an optical window 102 for transmitting incident light, and a main body 103 holding the optical window 102. In this example, light entering the main body 103 from the optical window 102 is detected by a detector (not shown) through an optical fiber 104.

The main body 103 is a cylindrical member, for example, and the optical window 102 is accommodated at one end section. Specifically, a recessed section having an inner diameter corresponding to the outer diameter of the optical window 102 is formed to the one end section of the main body 103, and the recessed section forms an optical window accommodation section 131 for accommodating the optical window 102. The optical window 102 is formed as a columnar shape, for example.

The optical window 102 is provided adjacent to the optical fiber 104, on a same axial line L100. An end surface of the optical window 102, on the opposite side of the optical fiber 104, forms an incident surface 121 into which light enters from outside. light entering from the incident surface 121 is transmitted inside the optical window 102 along the axial line L100, and is guided to the optical fiber 104 side.

Of the light entering from the incident surface 121, only the light in a predetermined field of view range R100 with the axial line L100 at the center enters the optical fiber 104. The field of view range R100 is dependent on the number of apertures (NA) of the optical fiber 104 and the shape of the optical window 102.

PRIOR ART DOCUMENTS

Patent Documents

Patent Document 1: Utility Model Registration No. 3182445

SUMMARY OF THE INVENTION

Problems to be Solved by the Invention

According to the conventional optical measurement probe 101 described above, light in the predetermined field of view range R100 with the axial line L100 at the center may enter the optical fiber 104, but light outside the range cannot enter the optical fiber 104. Accordingly, to allow light from a desired direction to enter the optical fiber 104, the optical measurement probe 101 has to be installed along the direction.

Accordingly, in a case where the installation position of the optical measurement probe 101 is limited, there is a problem that light from a desired direction may not enter the optical fiber 104. Particularly, in the case of installing the optical measurement probe 101 in an internal combustion engine of a car or the like, the installation position is limited in many cases, and the problem described above is likely to occur.

The present invention has been made in view of the above circumstance, and has its object to provide an optical measurement probe that is capable of causing light from a desired direction to enter a light guide even in a case where the installation position is limited, and an optical measurement device provided with the same.

Means for Solving the Problems

An optical measurement probe of the present invention is the optical measurement probe for guiding light that is generated at a time of combustion to an appliance, the optical measurement probe includes a light guide and a reflection surface. The light guide is for guiding light entering along a predetermined direction to an appliance. The reflection surface is for reflecting light from a direction different from the predetermined direction, and for causing the light to enter the light guide along the predetermined direction.

According to such a structure, light from a desired direction may be reflected by the reflection surface according to the angle of the reflection surface, and may be made to enter the light guide. Accordingly, even in a case where the installation position of the optical measurement probe is limited, if the angle of the reflection surface is appropriately set, light from the desired direction may be made to enter the light guide.

The optical measurement probe may further include a reflection coating that is formed on the reflection surface.

According to such a structure, by using the property of the reflection coating formed on the reflection surface, light may be reflected in a desired manner and may be made to enter the light guide.

The reflection coating may be a dielectric multilayer.

According to such a structure, by using the property of the dielectric multilayer, formed on the reflection surface, of being able to realize any reflectivity, light having a predetermined wavelength may be reflected with high efficiency, and may be made to enter the light guide.

Alternatively, the reflection coating may be a metal film.

According to such a structure, by using the property of the metal film formed on the reflection surface, light may be reflected in a manner according to the type of the metal, and may be made to enter the light guide.

The optical measurement probe may further include an optical window. The optical window may have the reflection surface, and may cause light entering from a side surface to be reflected by the reflection surface so as to enter the light guide.

According to such a structure, light entering from the side surface of the optical window is transmitted through the optical window, guided to the reflection surface, and reflected by the reflection surface so as to enter the light guide. Accordingly, by appropriately designing the shapes of the incident surface and the reflection surface of the optical window, various field of view ranges may be realized, and light entering the optical window from the side surface may be reflected at a desired angle and may be guided to the light guide.

An incident surface that is a curved surface may be formed at a part, of the side surface of the optical window, where light is to enter.

According to such a structure, by causing light to enter the optical window through the incident surface, which is a curved surface, the field of view range of light entering the light guide may be increased.

The optical measurement probe may further include a main body for holding the light guide and the optical window. In this case, the optical window may be attached at an end section of the main body with the reflection surface protruding outward.

According to such a structure, light may be reflected by the reflection surface protruding outward from the end section of the main body and may be made to enter the light guide, and also other light may be prevented by the main body from entering the light guide. Accordingly, only the light from a predetermined direction may suitably be made to enter the light guide.

An optical measurement device of the present invention is the optical measurement device includes the optical measurement probe and a detector for detecting light guided by the optical measurement probe.

Also, an optical measurement device of the present invention is the optical measurement device, wherein the optical measurement probe is attached to a cylinder head of an internal combustion engine in a manner facing an inside of a combustion chamber that is a measurement target.

In this case, the cylinder head may include a valve train driving member accommodation chamber for accommodating a valve train driving member, and the optical measurement probe may be provided on an opposite side from the valve train driving member accommodation chamber of the cylinder head.

Effects of the Invention

According to the present invention, even in a case where the installation position of an optical measurement probe is limited, if the angle of a reflection surface is appropriately set, light from a desired direction may be made to enter a light guide.

MODE FOR CARRYING OUT THE INVENTION

Figure 1:
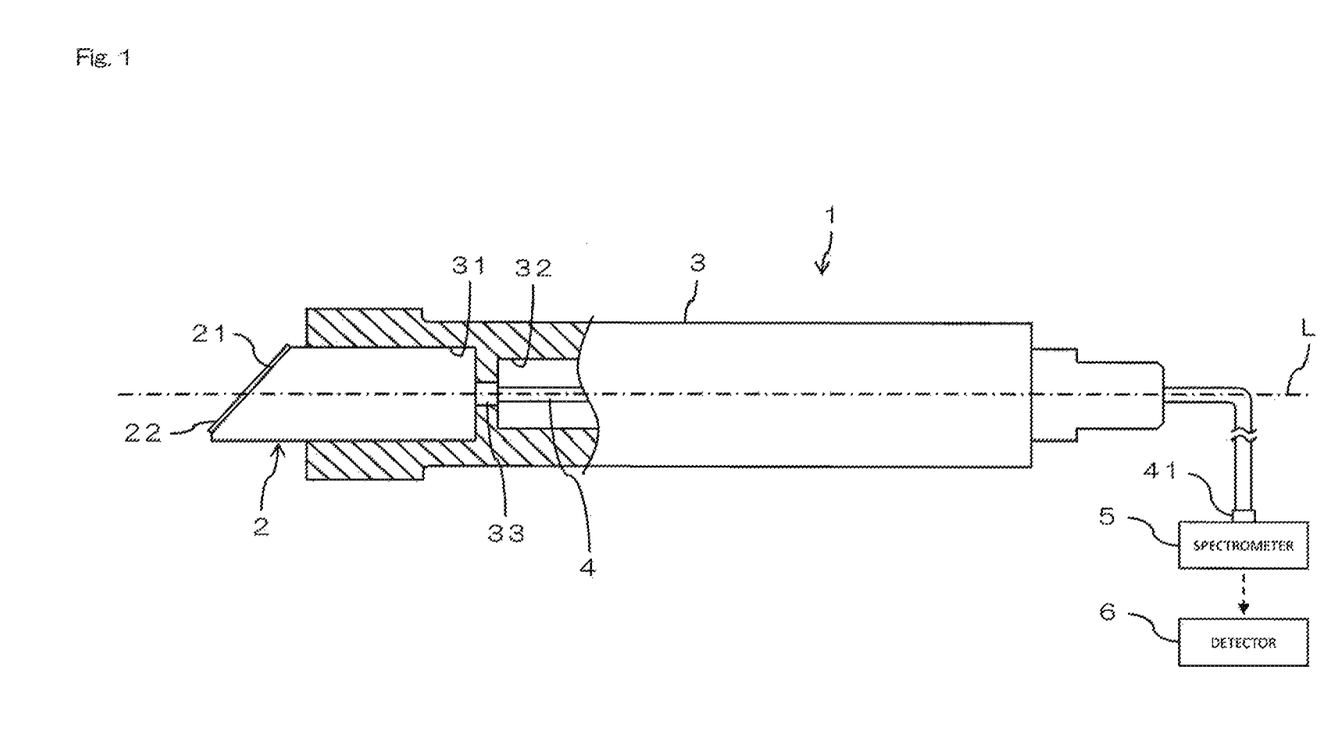
FIG. 1 is a diagram showing an example structure of an optical measurement device provided with an optical measurement probe according to an embodiment of the present invention.

FIG. 1 is a diagram showing an example structure of an optical measurement device provided with an optical measurement probe 1 according to an embodiment of the present invention. FIG. 1 shows a partial cross-sectional diagram of a specific structure of the optical measurement probe 1.

The optical measurement probe 1 according to the present embodiment is for guiding light that is generated at the time of combustion to an appliance, and is installed in a combustion chamber of an internal combustion engine of a car or a motorcycle, for example, and is used at the time of evaluation of a combustion state inside the combustion chamber, for example. The optical measurement probe 1 includes an optical window 2, a main body 3, an optical fiber 4, and the like. In FIG. 1, only a tip end section of the main body 3 of the optical measurement probe 1 is shown in cross section.

The optical window 2 is formed of quartz or sapphire, for example, and allows light entering from outside to be taken into the main body 3 by transmitting the light. The main body 3 is formed of metal such as stainless steel. The optical window 2 and the optical fiber 4 are integrally held by the main body 3, and light that is transmitted through the optical window 2 is made to enter one end section of the optical fiber 4 along the direction of an axial line L.

The main body 3 is formed as a cylindrical shape, for example, and the optical window 2 is accommodated at one end section of the main body 3. Specifically, a recessed section having an inner diameter corresponding to the outer diameter of the optical window 2 is formed at the one end section of the main body 3, and the recessed section forms an optical window accommodation section 31 for accommodating the optical window 2. Also, an optical fiber accommodation section 32 for accommodating the optical fiber 4 is formed to the main body 3 by a recessed section extending from the other end section side. The optical window accommodation section 31 and the optical fiber accommodation section 32 communicate with each other through a communicating hole 33, and light that is transmitted through the optical window 2 is to enter the optical fiber 4 inside the optical fiber accommodation section 32 through the communicating hole 33.

The optical measurement device according to the present embodiment includes, in addition to the optical measurement probe 1 as described above, a spectrometer 5, a detector 6, and the like. The spectrometer 5 is disposed on the other end section side of the optical fiber 4. A connector 41 is attached to the other end section side of the optical fiber 4, and the connector 41 is connected to the spectrometer 5. Light that is received by the optical measurement probe 1 enters the spectrometer 5 from the other end section side of the optical fiber 4, and light dispersed by the spectrometer 5 is detected by the detector 6.

In the present example, the optical window 2 is formed as a columnar shape, and a tapered surface 21 is formed at the end section on the incident side. Specifically, the optical window 2 extends along the same axial line L as the optical fiber 4, and its end surface opposite from the optical fiber 4 side in the axial line L direction is formed by the tapered surface 21. That tapered surface 21 is preferably inclined with respect to the axial line L at an angle between 30 degrees and 60 degrees, and in the present example, the tapered surface 21 is inclined at an angle of about 45 degrees.

A dielectric multilayer 22 is formed in the tapered surface 21, for example. The dielectric multilayer 22 is formed from a plurality of types of films with different refractive indices, and by sequentially vapor depositing the films on the tapered surface 21, the dielectric multilayer 22 on which films with appropriate thickness are stacked may be integrally formed with the optical window 2.

The dielectric multilayer 22 may have a structure in which low refractive index films formed of material with a low refractive index and high refractive index films formed of material with a high refractive index are alternately stacked. In this case, the low refractive index film may be an $SiO_2$ film, and the high refractive index film may be a $Ta_2O_5$ film, for example. Such a dielectric multilayer 22 may be formed by using a known method such as an ion plating method.

This type of dielectric multilayer 22 has a property of reflecting light having a predetermined wavelength with high efficiency. The dielectric multilayer 22 is not limited to the structure as described above, and may be formed by using various other types of materials such as $HfO_2$, $Al_2O_3$, $MgF_2$, $TiO_2$, and $ZrO_2$. Also, the dielectric multilayer 22 may be formed by stacking three or more kinds of optical thin films.

In this case, the dielectric multilayer 22 is preferably designed and formed by taking into account the influence, on the reflectivity, of materials (such as soot, oil, and the like) which would adhere to the dielectric multilayer 22 in the usage environment of the optical measurement probe 1.

Figure 2:
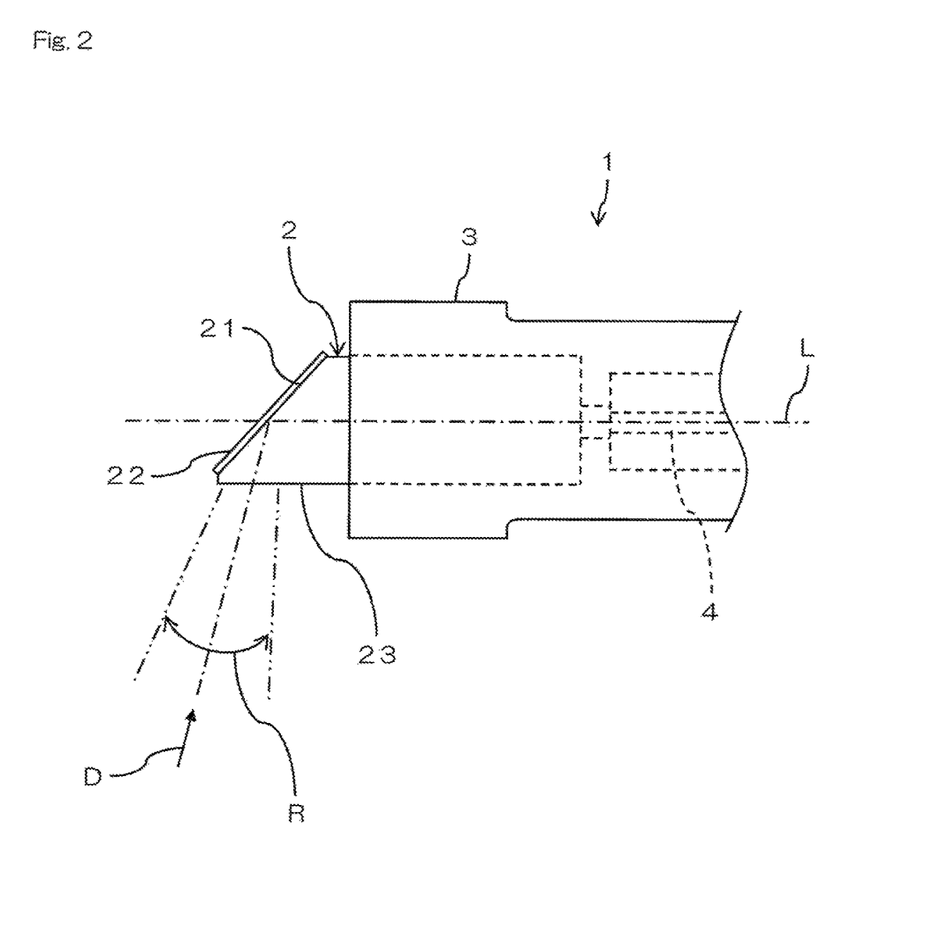
FIG. 2 is a side view diagram for describing a mode of entering of light into an optical window.
Figure 3:
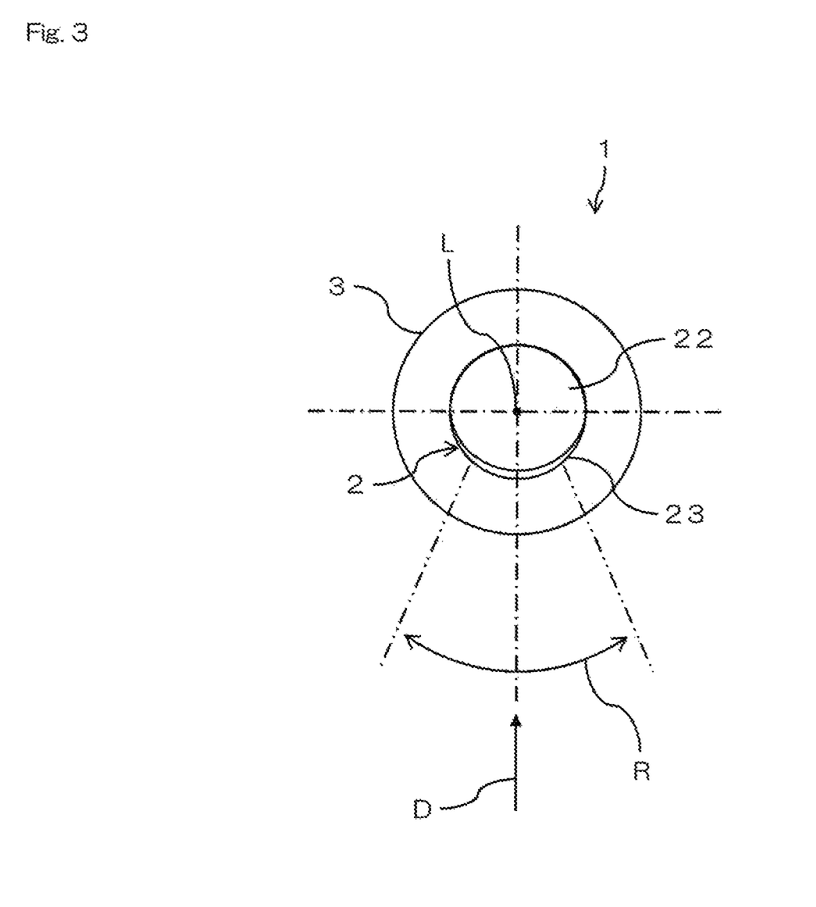
FIG. 3 is a front view diagram for describing a mode of entering of light into the optical window.

FIGS. 2 and 3 are diagrams for describing a mode of entering of light into the optical window 2, and FIG. 2 shows a side view, and FIG. 3 shows a front view.

In a state where the optical window 2 is attached to an end section of the main body 3, the tapered surface 21 is protruded outward. In the present embodiment, a side surface 23 of the optical window 2 is a light incident surface, and light entering the side surface 23 from a direction D intersecting the axial line L direction is transmitted through the optical window 2 and is reflected by the tapered surface 21, and is guided to the optical fiber 4.

That is, the tapered surface 21 of the optical window 2 forms a reflection surface for reflecting light from the direction D, which is different from the axial line L direction, and for causing the light to enter the optical fiber 4 along the axial line L direction. Also, the dielectric multilayer 22 forms a reflection coating formed on the reflection surface (tapered surface 21).

Of the light entering from the side surface 23 of the optical window 2, only the light in a predetermined field of view range R with the direction D at the center enters the optical fiber 4, and other light may be prevented by the main body 3 from entering the optical fiber 4. Accordingly, light may suitably be caused to enter the optical fiber 4 from only the predetermined direction D. The field of view range R is dependent on the number of apertures (NA) of the optical fiber 4 and the shape of the optical window 2.

In the present embodiment, light from the desired direction D may be reflected by the tapered surface 21 according to the angle of the tapered surface 21 and may be made to enter the optical fiber 4. Accordingly, even in a case where the installation position of the optical measurement probe 1 is limited, if the angle of the tapered surface 21 is appropriately set, light from the desired direction D may be made to enter the optical fiber 4.

Particularly, since the dielectric multilayer 22 is formed on the tapered surface 21, by using the property of the dielectric multilayer 22, light having a desired wavelength may be reflected with high efficiency and may be made to enter the optical fiber 4.

Also, in the present embodiment, by appropriately designing the shapes of the incident surface (side surface 23) and the reflection surface (tapered surface 21) of the optical window 2, various field of view ranges R may be realized, and light entering the optical window 2 from the side surface 23 may be reflected at a desired angle and may be guided to the optical fiber 4. Since the side surface 23 of the optical window 2 according to the present embodiment is a curved surface formed from a circumferential surface, the field of view range R on a plane orthogonal to the axial line L is wide, as shown in FIG. 3.

That is, by causing light to enter the optical window 2 through the side surface 23, which is a curved surface, light over a wide range may be refracted and guided to the tapered surface 21, and may be reflected by the tapered surface 21 so as to enter the optical fiber 4, and thus the field of view range R of light entering the optical fiber 4 may be increased. Specifically, on a plane, as shown in FIG. 3, that is orthogonal to the axial line L, light over an angle range of about 60 degrees to 70 degrees around the axial line L may be made to enter the optical fiber 4.

Additionally, the same effect as described above may be achieved by a structure in which an incident surface which is a curved surface is formed only at a part of the side surface 23 of the optical window 2 where light is to enter, without being limited to a structure in which the entire side surface 23 of the optical window 2 is formed from a circumferential surface. Also, the curved surface is not limited to a circumferential surface, and may be formed as various other shapes.

Figure 4:
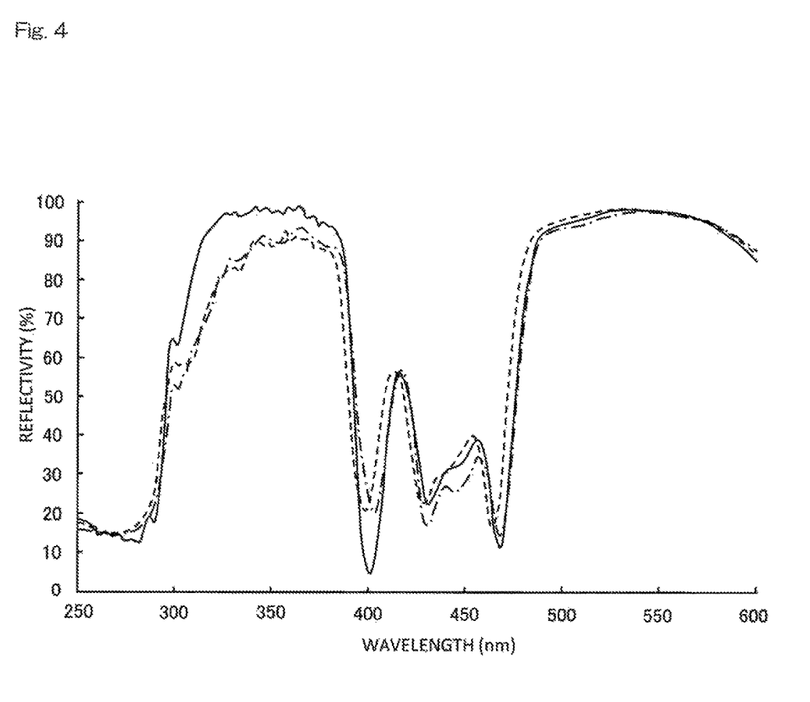
FIG. 4 is a diagram showing results of a heat resistance evaluation test for a dielectric multilayer.

FIG. 4 is a diagram showing results of a heat resistance evaluation test for the dielectric multilayer 22. In the test, the dielectric multilayer 22 having a high reflectivity at a predetermined wavelength was used, and evaluation of heat resistance was performed by comparing, with the initial reflectivity (solid line in FIG. 4), the reflectivity in a case where the dielectric multilayer 22 was heated by a burner for 40 minutes (dashed-dotted line in FIG. 4) and the reflectivity in a case where the dielectric multilayer 22 was heated in a constant temperature furnace at 850 degrees for three hours (broken line in FIG. 4).

It can be seen from the results in FIG. 4 that the reflectivity of the dielectric multilayer 22 is not easily reduced even if the dielectric multilayer 22 is placed in a high temperature state for a long time. Accordingly, even in a high temperature environment such as where the optical measurement probe 1 is to measure the light that is generated at the time of combustion, only the light having a predetermined wavelength may suitably be reflected by the dielectric multilayer 22 and may be guided to the optical fiber 4.

In the embodiment described above, a structure in which the dielectric multilayer 22 is formed on the tapered surface 21 of the optical window 2 is described. However, such a structure is not restrictive, and a structure in which a metal film is formed on the tapered surface 21 of the optical window 2 is also possible. In this case, by using the property of a metal film formed on the tapered surface 21, light may be reflected in a manner according to the type of the metal and may be made to enter the optical fiber 4. The metal film is preferably formed of metal whose melting point is 1000° C. or higher.

For example, in a case where the metal film is made of aluminum, a reflection coating which is inexpensive and which has a high reflectivity may be achieved. In a case where the metal film is made of gold, a reflection coating which is capable of suitably reflecting light having an infrared wavelength may be achieved. In a case where the metal film is made of rhodium, a reflection coating whose melting point is extremely high and which has a high heat resistance may be achieved.

By using the property of the reflection coating formed on the tapered surface 21 in the manner described above, light may be reflected in a desired manner and may be made to enter the optical fiber 4. The reflection coating may be formed by an arbitrary material according to necessary property, without being limited to the dielectric multilayer 22 or the metal film.

Figure 5A:
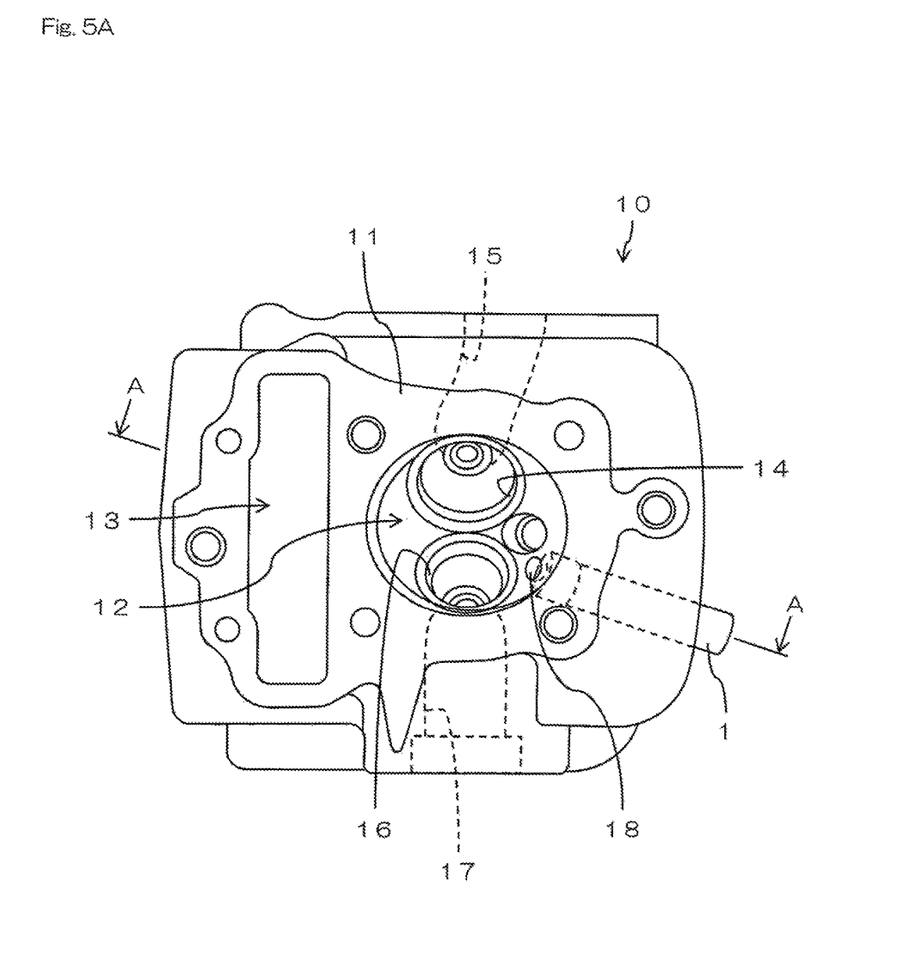
FIG. 5A is a diagram showing the position of attachment of the optical measurement probe to a cylinder head.
Figure 5B:
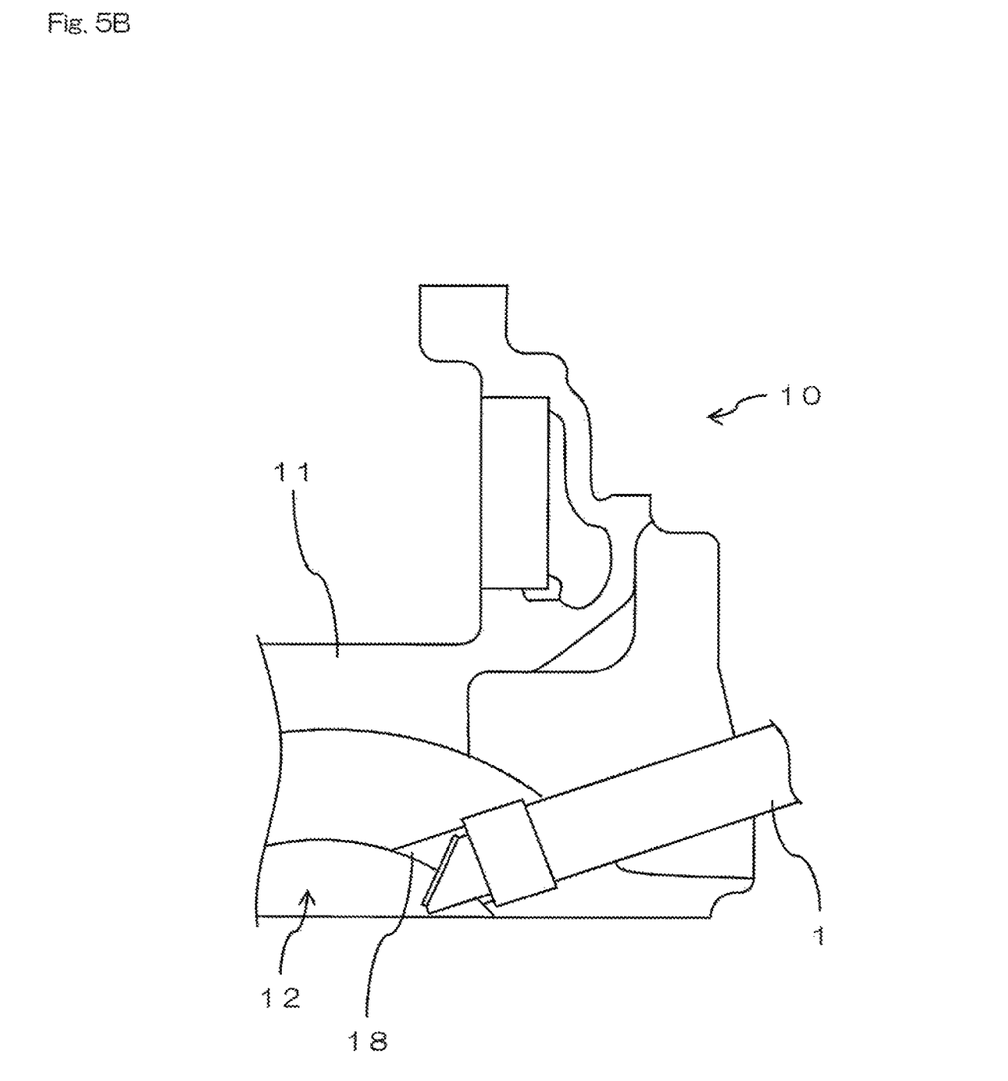
FIG. 5B is a cross-sectional diagram showing a cross section along A-A in FIG. 5A.

FIG. 5A is a diagram showing the position of attachment of the optical measurement probe 1 to a cylinder head 11. Also, FIG. 5B is a cross-sectional diagram showing a cross section along A-A in FIG. 5A. For example, a combustion chamber 12 which is surrounded by the cylinder head 11, and a cylinder block and a piston, not shown, is formed to an internal combustion engine 10 of a car, a motorcycle or the like.

The optical measurement probe 1 is attached to the cylinder head 11 in a manner facing the inside of the combustion chamber 12, which is a measurement target, for example. Specifically, a valve train driving member accommodation chamber 13 for accommodating a valve train driving member (such as a cam chain), not shown, is formed to the cylinder head 11, and the optical measurement probe 1 is disposed on the opposite side from the valve train driving member accommodation chamber 13 across the center of the cylinder.

An intake port 15 communicating with an intake valve opening 14 which is open toward the combustion chamber 12, and an exhaust port 17 communicating with an exhaust valve opening 16 which is open toward the combustion chamber 12 are formed to the cylinder head 11. In the present example, an opening 18 for a probe, which is open toward the combustion chamber 12, is formed near the intake valve opening 14 and the exhaust valve opening 16 of the cylinder head 11.

The opening 18 for a probe is provided on the opposite side from the valve train driving member accommodation chamber 13 with respect to the intake valve opening 14 and the exhaust valve opening 16, for example. At the time of evaluation of a combustion state in the combustion chamber 12 of the internal combustion engine 10, light that is generated inside the combustion chamber 12 may be guided to the optical measurement probe 1 through the opening 18 for a probe.

In the embodiment described above, a structure in which light enters from the incident surface (side surface 23), which is a curved surface, formed to the optical window 2 is described. However, such a structure is not restrictive, and light may also enter from an incident surface which is not a curved surface, such as a flat surface. In this case, the optical window 2 may be formed as other than a columnar shape, such as a cuboid shape.

Furthermore, the incident surface where light is to enter, and the reflection surface for reflecting the light entering from the incident surface do not have to be formed to the optical window 2, and a member (mirror) having a reflection surface may be separately provided, for example. If the incident surface and the reflection surface are made polished surfaces, loss of light may be reduced. The reflection surface is not limited to a structure having a reflection coating formed thereon as long as it is capable of reflecting light and of causing the light to enter the optical fiber 4.

The optical fiber 4 may guide light to appliances other than the spectrometer 5. Also, the light guide for guiding light to an appliance may guide the light by using a member other than the optical fiber 4.

Additionally, the optical measurement probe 1 according to the present invention is not limited to be installed in a combustion chamber of an internal combustion engine of a car, a motorcycle or the like, and is capable of being installed in any high temperature environment so as to guide light that is generated at the time of combustion to an appliance.

DESCRIPTION OF REFERENCE SIGNS 1 optical measurement probe
2 optical window
3 main body
4 optical fiber
5 spectrometer
6 detector
10 internal combustion engine
11 cylinder head
12 combustion chamber
13 valve train driving member accommodation chamber
14 intake valve opening
15 intake port
16 exhaust valve opening
17 exhaust port
18 opening for probe
21 tapered surface
22 dielectric multilayer
23 side surface
31 optical window accommodation section
32 optical fiber accommodation section
33 communicating hole
41 connector
R field of view range

The invention claimed is:

1. An optical measurement probe for guiding light that is generated at a time of combustion to an appliance, the optical measurement probe comprising:
   a light guide for guiding light entering along a predetermined direction to an appliance; and
   a reflection surface for reflecting light from a direction different from the predetermined direction, and for causing the light to enter the light guide along the predetermined direction,
   wherein the light in a predetermined field of view range having the direction different from the predetermined direction at a center enters the light guide, and the predetermined field of view range spreads toward a measurement target side.

2. The optical measurement probe according to claim 1, further comprising a reflection coating that is formed on the reflection surface.

3. The optical measurement probe according to claim 2, wherein the reflection coating is a dielectric multilayer.

4. The optical measurement probe according to claim 2, wherein the reflection coating is a metal film.

5. The optical measurement probe according to claim 1, further comprising an optical window, having the reflection surface, for causing light entering from a side surface to be reflected by the reflection surface so as to enter the light guide.

6. The optical measurement probe according to claim 5, wherein an incident surface that is a curved surface is formed at a part, of the side surface of the optical window, where light is to enter.

7. The optical measurement probe according to claim 5, further comprising a main body for holding the light guide and the optical window,
   wherein the optical window is attached at an end section of the main body with the reflection surface protruding outward.

8. An optical measurement device comprising:
   an optical measurement probe according to claim 1; and
   a detector for detecting light guided by the optical measurement probe.

9. An optical measurement device, wherein an optical measurement probe according to claim 1 is attached to a cylinder head of an internal combustion engine in a manner facing an inside of a combustion chamber that is a measurement target.

10. The optical measurement device according to claim 9,
   wherein the cylinder head includes a valve train driving member accommodation chamber for accommodating a valve train driving member, and
   wherein the optical measurement probe is provided on an opposite side from the valve train driving member accommodation chamber of the cylinder head.

* * * * *